(12) United States Patent
Yoshizawa et al.

(10) Patent No.: US 7,542,477 B2
(45) Date of Patent: Jun. 2, 2009

(54) ELECTRONIC APPARATUS AND CONTENT MANAGING METHOD FOR STORAGE AND TRANSMISSION OF COMPRESSED AND ENCODED CONTENT IN A NETWORK

(75) Inventors: Junichi Yoshizawa, Fuchu (JP); Hiroki Iwahara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 594 days.

(21) Appl. No.: 11/233,813

(22) Filed: Sep. 23, 2005

(65) Prior Publication Data

US 2006/0245490 A1     Nov. 2, 2006

(30) Foreign Application Priority Data

Apr. 28, 2005    (JP)    ............... 2005-132052

(51) Int. Cl.
*H04L 12/56*    (2006.01)
(52) U.S. Cl. .................. 370/401; 370/428; 709/217; 709/238
(58) Field of Classification Search .......... 370/392, 370/401
See application file for complete search history.

(56) References Cited

U.S. PATENT DOCUMENTS

| 6,407,680 | B1 | | 6/2002 | Lai |
| 7,031,259 | B1 | * | 4/2006 | Guttman et al. ............ 370/235 |
| 2001/0007998 | A1 | | 7/2001 | Yoshiasa |
| 2002/0071438 | A1 | * | 6/2002 | Singh .......................... 370/398 |
| 2003/0165139 | A1 | * | 9/2003 | Chen et al. .................. 370/392 |
| 2004/0172376 | A1 | | 9/2004 | Kobori et al. |

FOREIGN PATENT DOCUMENTS

| EP | 1 049 305 | 11/2000 |
| JP | 2002-41405 | 2/2002 |
| JP | 2002-351912 | 12/2002 |
| JP | 2003-58462 | 2/2003 |
| JP | 2004-48190 | 2/2004 |
| JP | 2004-128828 | 4/2004 |
| JP | 2004-526227 | 8/2004 |

\* cited by examiner

*Primary Examiner*—Chirag G Shah
*Assistant Examiner*—Salvador E Rivas
(74) *Attorney, Agent, or Firm*—DLA Piper LLP US (57) ABSTRACT

An electronic apparatus includes a network connecting unit configured to make network connection with a client. A storage unit stores content which has been compressed and encoded. A transcoding unit is configured to convert the content stored in the storage unit to content compressed and encoded in a different format for the client connected via the network connecting unit. A content transmitting unit is configured to transmit the content stored in the storage unit or the content converted by the transcoding unit to the client connected via the network connecting unit. A control unit is configured to store content which meets a predetermined condition specific to the client in the storage unit from among the content converted by the transcoding unit.

10 Claims, 9 Drawing Sheets

| Input format | Output format | Judgment result |
|---|---|---|
| MPEG-2 | MPEG-4 | Recording is carried out |
| MEPG-2 | WMV | No recording is carried out |
| MP3 | AAC | Recording is carried out |

| Content type | Preprocessing condition |
|---|---|
| Music | Name of artist=xxx |
| Video | Television image recording of channel yyy |
| ⋮ | ⋮ |

ELECTRONIC APPARATUS AND CONTENT MANAGING METHOD FOR STORAGE AND TRANSMISSION OF COMPRESSED AND ENCODED CONTENT IN A NETWORK

CROSS-REFERENCE TO RELATED APPLICATIONS

This application is based upon and claims the benefit of priority from prior Japanese Patent Application No. 2005-132052, filed Apr. 28, 2005, the entire contents of which are incorporated herein by reference.

BACKGROUND OF THE INVENTION

1. Field of the Invention

The present invention relates to a content managing technique for improving convenience when transmitting and receiving via a network audio video (AV) content compressed and encoded from or to so called digital consumer electronic appliance products for household use, such as a digital versatile disk (DVD) recorder, a hard disk drive (HDD) video recorder, a personal computer, a personal digital assistant (PDA), or a cellular phone, for example.

2. Description of the Related Art

In recent years, networking of so called digital consumer electronic appliance products, such as DVD recorders or HDD video recorders, has progressed remarkably. For example, as is apparent from the efforts of the Digital Living Network Alliance (DLNA), great attention has been focused on connecting a plurality of digital consumer electronic appliance products via a network and exchanging AV content between them.

When content is transferred, two large problems exist in view of intra-equipment compatibility: (1) compatibility of protocols for use in transfer; and (2) a compression format of content to be transferred.

The DLNA has established a guideline in order to solve these problems. With respect to a compression format of item (2), compatibility is guaranteed by using a method for "specifying an essential format". The problem which occurs here is that, in general, between a stationary household device and a mobile device for portable use, different compression formats are often used in view of processor capacity, memory consumption, power consumption or the like. For example, in terms of video content, a stationary device can conform to MPEG-2, and a mobile device can conform to MPEG-4.

In such a situation, for example, when an attempt is made to download and view video content which exists in a (stationary) household device by using a mobile device, it is necessary to convert MPEG-2 content to MPEG-4 content, and then, transfer the converted content. In the case where a household device includes a transcoder which converts MPEG-2 to MPEG-4, it is possible to achieve conversion using only the two devices of the parties concerned.

On the other hand, where the household device fails to include a transcoding function from MPEG-2 to MPEG-4, a third relay device can be used over a network to perform transcoding. This is a particularly effective technique in a closed world, such as a household network, where sharing the transcoding function or resources can be readily achieved.

However, where content is directly exchanged between the parties and where content is exchanged while a relay device is-interposed, there still remains a general problem that a predetermined amount of processing time is required for this transcoding.

In addition, as one technique for enhancing responsiveness, a method has been proposed for storing content converted by the transcoder in a cache after being converted (refer to Jap. Pat. Appln. KOKAI Publication No. 2004-526227, for example). According to this technique, for example, with respect to second and subsequent requests, it becomes possible to enhance system responsiveness.

The system described in the Jap. Pat. Appln. KOKAI Publication No. 2004-526227 is tailored for an unspecified number of users. For example, a so called majority rule is established for satisfying many more users from among all the users, for example, for determining the content stored in a cache after being converted using a Least Recently Used algorithm.

However, in digital consumer electronic appliance products for household use, it is necessary to properly respond to a specialized demand of each user.

BRIEF SUMMARY OF THE INVENTION

According to an embodiment of the present invention, an electronic apparatus includes a network connecting unit configured to make network connection with a client. A storage unit stores content which has been compressed and encoded. A transcoding unit is configured to convert the content stored in the storage unit to content compressed and encoded in a different format for the client connected via the network connecting unit. A content transmitting unit is configured to transmit the content stored in the storage unit or the content converted by the transcoding unit to the client connected via the network connecting unit. A control unit is configured to store content which meets a predetermined condition specific to the client in the storage unit from among the content converted by the transcoding unit.

According to another embodiment of the present invention, an electronic apparatus comprises a network connecting unit configured to make network connection with another apparatus; A storage unit stores data. A relay unit is configured to transmit and receive content compressed and encoded between a transmitting apparatus and a receiving apparatus connected via the network connecting unit. A transcoding unit is configured to convert the content to be relayed to content compressed and encoded in a different format for the receiving apparatus in which transmission and receiving of the content are relayed by the relay unit. A control unit is configured to store content meeting a predetermined condition specific to the receiving apparatus in the storage unit from among the content converted by the transcoding unit.

According to another embodiment of the present invention, a content managing method employs an electronic apparatus which has a network connecting unit configured to make network connection; a storage unit which stores data; and a relay unit configured to transmit and receive content compressed and encoded between a transmitting apparatus and a receiving apparatus connected via the network connecting unit. The content to be relayed is converted to content compressed and encoded in a different format for the receiving apparatus in which transmission and receiving of the content is relayed by the relay unit. Content meeting a predetermined condition specific to the receiving apparatus is stored in the storage unit from among the converted content.

BRIEF DESCRIPTION OF THE SEVERAL VIEWS OF THE DRAWING

The accompanying drawings, which are incorporated in and constitute a part of the specification, illustrate several embodiments of the invention.

DETAILED DESCRIPTION OF THE INVENTION

Embodiments will be described with reference to the accompanying drawings.

First Embodiment

Figure 1:
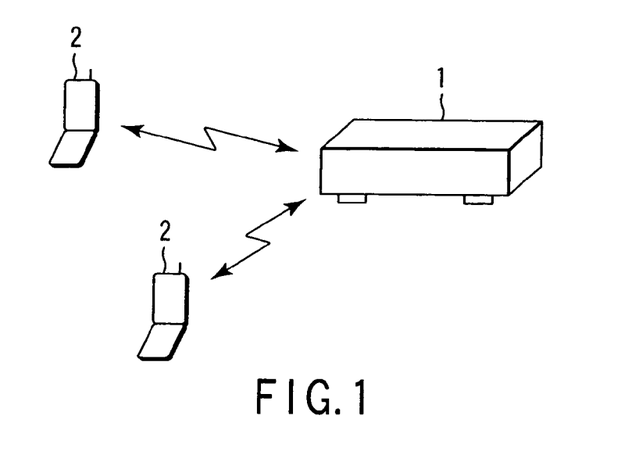
FIG. 1 is a view showing a network configuration of a in-house network system according to a first embodiment.

A first embodiment of the present invention will be described. FIG. 1 is a view showing a network configuration of a in-house network system according to the first embodiment.

As shown in FIG. 1, the in-house network system according to the first embodiment includes a stationary electronic apparatus 1 such as a DVD recorder, for example, and an electronic apparatus 2 for portable use such as a cellular phone being connected via a wireless LAN. Multiple content such as program data obtained by recording a television broadcast, for example, is stored in the electronic apparatus 1 installed in a living room of each house. A user can view the content stored in this electronic apparatus 1 in any place such as one's own room and at any time by using one's own electronic apparatus 2.

As used herein, the electronic apparatus 1 stores the content in accordance with the MPEG-2 compression format and has a transcoding function of transcoding the compression format of the content to a different compression format such as MPEG-4 or WMV. On the other hand, it is presumed that the electronic apparatus 2 has a content reproducing function capable of reproducing only the content in the MPEG-4 compression format. Namely, in this in-house network system, when content is transferred from the electronic apparatus 1 to the electronic apparatus 2, transcoding of the content is executed by the electronic apparatus 1. Even in an environment which requires this transcoding, control is made so as not to degrade the user's operability. FIG. 1 shows the electronic apparatus 1 and the electronic apparatus 2 connected to each other via any wireless or wired technology such as IEEE 802.11, IEEE 802.3 or Bluetooth (registered trademark) for example. In addition, when content is transferred between stationary electronic apparatuses as well as when content is transferred to a mobile device for portable use, the present invention is effective in the case where there is a need for transcoding.

Figure 2:
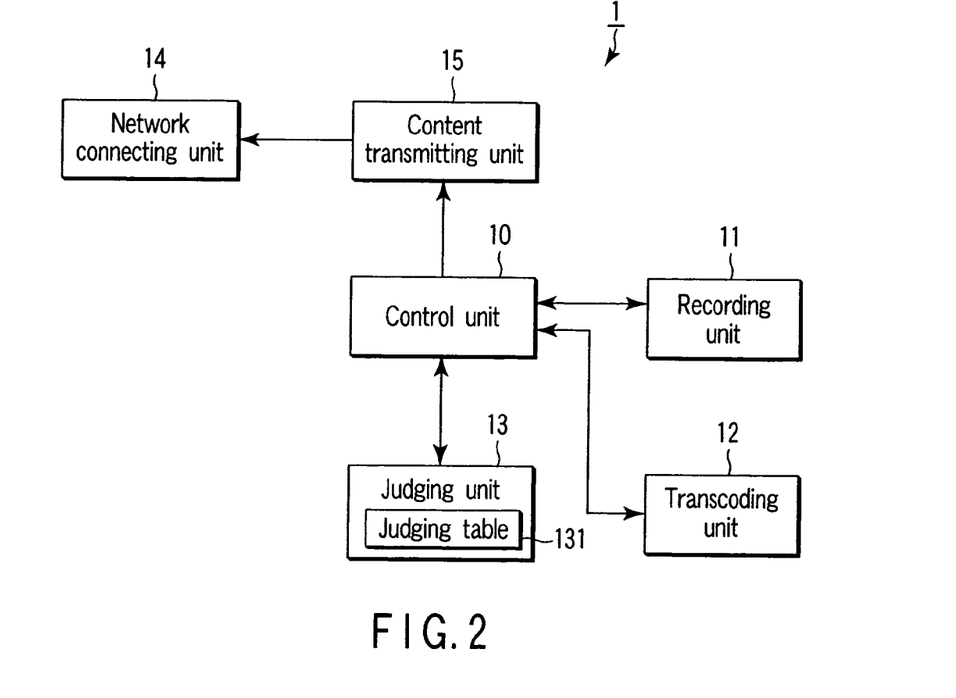
FIG. 2 is a view showing a system configuration of an electronic apparatus (information transmitter device) according to the first embodiment.

FIG. 2 is a view showing a system configuration of the electronic apparatus 1. As shown in the figure, the electronic apparatus 1 has a control unit 10, a recording unit 11, a transcoding unit 12, a judging unit 13, a network connecting unit 14, and a content transmitting unit 15.

The control unit 10 is responsible for overall control of this electronic apparatus 1, and is achieved by an MPU or the like, for example. The recording unit 11 is achieved by a hard disk drive (HDD) or the like, for example, and stores a variety of data including content such as the program data obtained by recording a television program. The transcoding unit 12 is an encoding type converter device (transcoder) which converts content from one compression format to another.

When the transcoded content is transferred to another device via a network, the judging unit 13 judges whether or not to store new content produced after being transcoded in the recording unit 11. In order to perform this judgment, the judging unit 13 comprises a judging table 131 described later. The network connecting unit 14 can employ any wired or wireless technology. Further, this network connecting unit 14 includes Universal Plug-and-Play (UPnP) capability. In addition, the content transmitting unit 15 controls transmission of the new content produced by the transcoding unit 12 to another device via a network.

A general flow of operation will be described with reference to FIGS. 3A and 3B with respect to how a list of content reserved in one device (server) is acquired and referred to from another device (client).

Assume that the client has a content reproducing function capable of reproducing only content in accordance with the MPEG-4 compression format. On the other hand, presume that the server has content A which conforms to the MPEG-2 compression format and content B which conforms to the MPEG-4 compression format. Under such a presumption, FIG. 3A shows a flow of operation in the case where the server fails to have a transcoding function from MPEG-2 to MPEG-4; and FIG. 3B shows a flow of operation in the case where the server has the transcoding function.

Figure 3A:
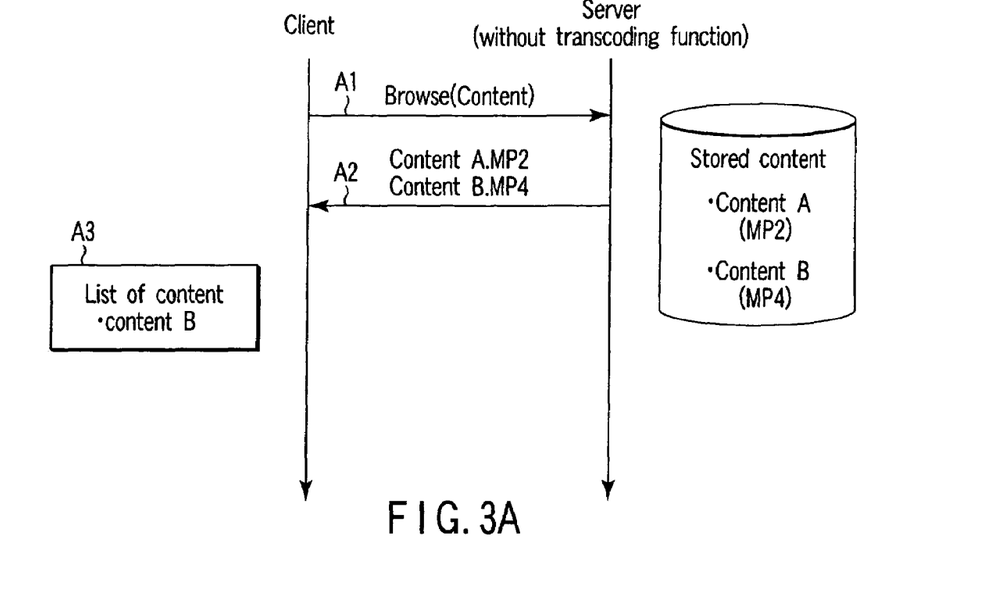
FIGS. 3A and 3B each are views for explaining a general flow of operation relevant to how a list of content reserved in one device is acquired and referred to from another device.

First, the client makes a query to the server as to what kinds of content can be provided (A1 of FIG. 3A). In response to this query, the server which does not have the transcoding function returns to the client the fact that the MPEG-2 compression format content A and the MPEG-4 compression format content B can be provided (A2 of FIG. 3A). On the other hand, in response to this query, the server which has the transcoding function returns to the client the fact that the MPEG-4 compression format version of content A can be provided in addition to the two pieces of content actually possessed (B2' of FIG. 3B).

Upon the receipt of the response from the server, the client displays a list of the MPEG-4 compression format content which can be reproduced by the client. As a result, in the case of FIG. 3A, only content B is displayed in listings (A3 of FIG. 3A). In the case of FIG. 3B, both content A and B are displayed in listings (B3' of FIG. 3B).

Figure 3B:
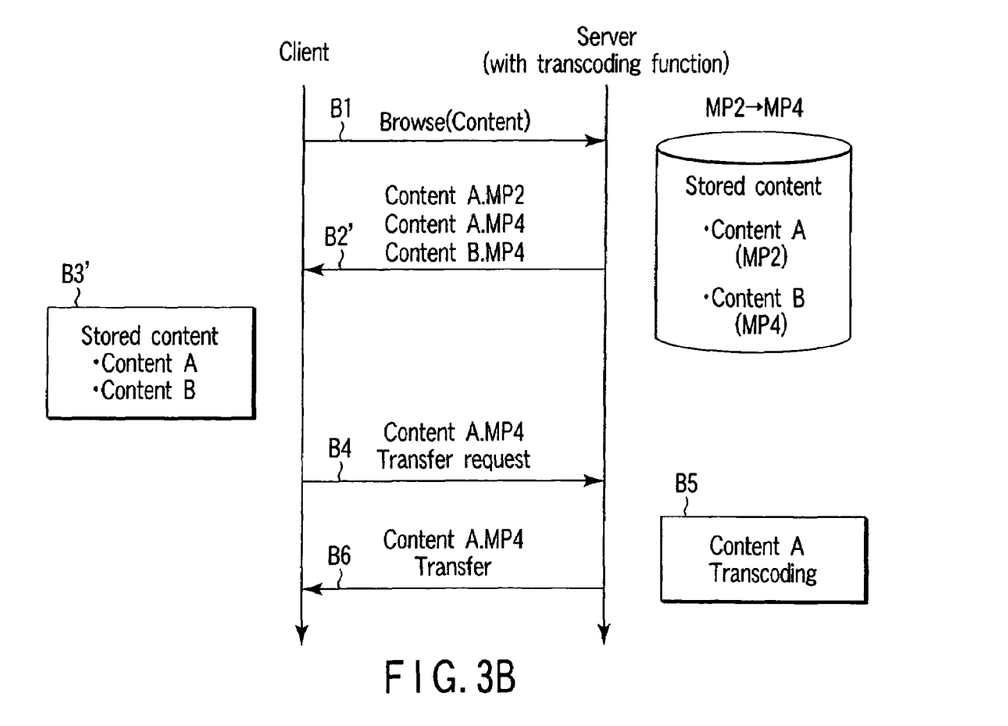

Upon the receipt of this listing (B3' of FIG. 3B), when the user selects content A, a transfer request relevant to the MPEG-4 compression format content A is sent from the client to the server (B4 of FIG. 3B). Then, a transcoding process occurs at the server side (B5 of FIG. 3B), and content A after being transcoded is transferred (B6 of FIG. 3B).

Thus, in the case where the content stored in the recording unit 11 has been requested by electronic apparatus 2, corresponding to the client in FIG. 3B, in a compression format which is different from the compression format in which the content is stored, the electronic apparatus 1 having the transcoding unit 12 and corresponding to the server shown in FIG. 3B executes transcoding for responding to this request. Then, the electronic apparatus 1 according to the present embodiment uses the judging unit 13 to properly manage the user's content after it is transcoded.

Figure 4:
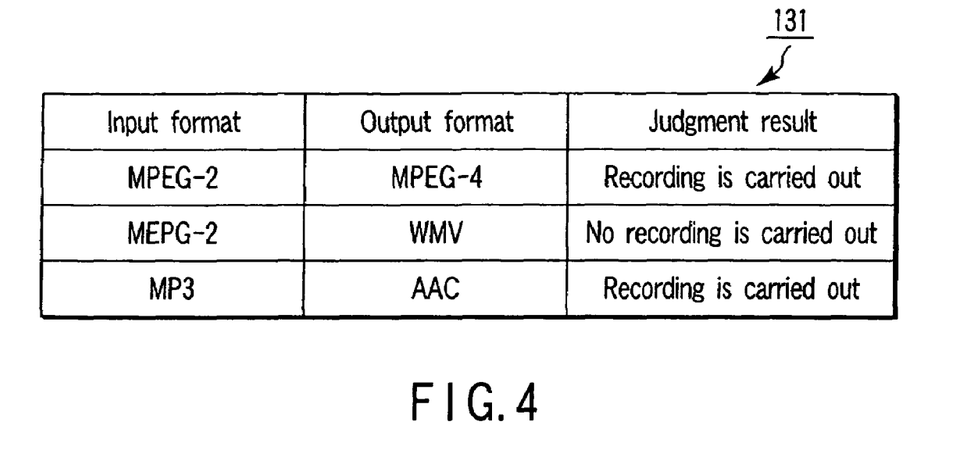
FIG. 4 is a view showing a specific example of a judging table provided in a judging unit of the electronic apparatus (information transmitter device) according to the first embodiment.

FIG. 4 shows a specific example of a judging table 131 which is included in the judging unit 13. As shown in the figure, the judging table 131 consists of three fields such as an "input format", an "output format", and a "judgment result". According to this judging table 131, where the content stored in the recording unit 11 is in the MPEG-2 compression format and is transcoded to the MPEG-4 compression format, the MPEG-4 compression format content is stored in the recording unit 11. In addition, where the content stored in the recording unit 11 is in the MPEG-2 compression format and is transcoded to a WMV compression format, the WMV compression format content is discarded without being stored. Similarly, where the content stored in the recording unit 11 is in the MP3 compression format and is transcoded to the AAC compression format, the AAC compression format content is stored in the recording unit 11.

As described above, with the electronic apparatus 1 of the present embodiment, it becomes possible to carry out a variety of operations for each user in accordance with the judging unit 131, for example, by storing only when a large amount of time is required for transcoding, for further reuse; by storing content in frequently used compression formats after being transcoded; or properly coping with free space of the recording unit 11 at the time of storage. The judging table 131 may be produced by any existing method, for example, by preparing a setup screen for a user interface. In addition, apart from the table produced by the user, the judging unit 13 may produce the table automatically by using a statistic technique so as to record a transfer history as to what pattern of transcoding has been carried out. This approach can be used to store the content after being transcoded, which has a pattern of being used more frequently in excess of a threshold value.

Figure 5:
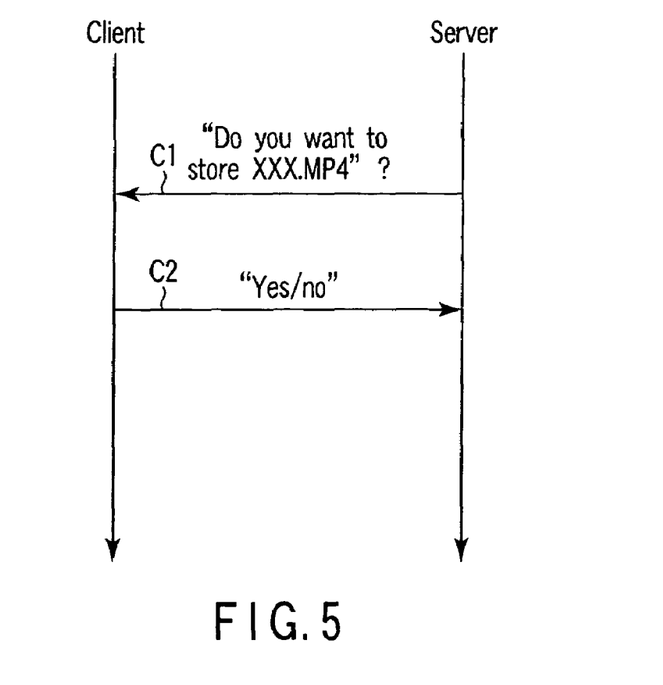
FIG. 5 is a view for explaining an exchange which is carried out by a control unit of the electronic apparatus (information transmitter device) according to the first embodiment.

In addition, instead of using judging table 131, when transcoding has been carried out from one compression format to another compression format, as shown in FIG. 5, the control unit 10 can make a query (C1 of FIG. 5) to a content request source as to whether or not to store the content after being transcoded every time such transcoding is carried out, whereby the control unit 10 may control whether or not the content is stored after being transcoded according to a response. By using this procedure, it becomes possible to manage content after being transcoded according to the user's request.

Figure 6:
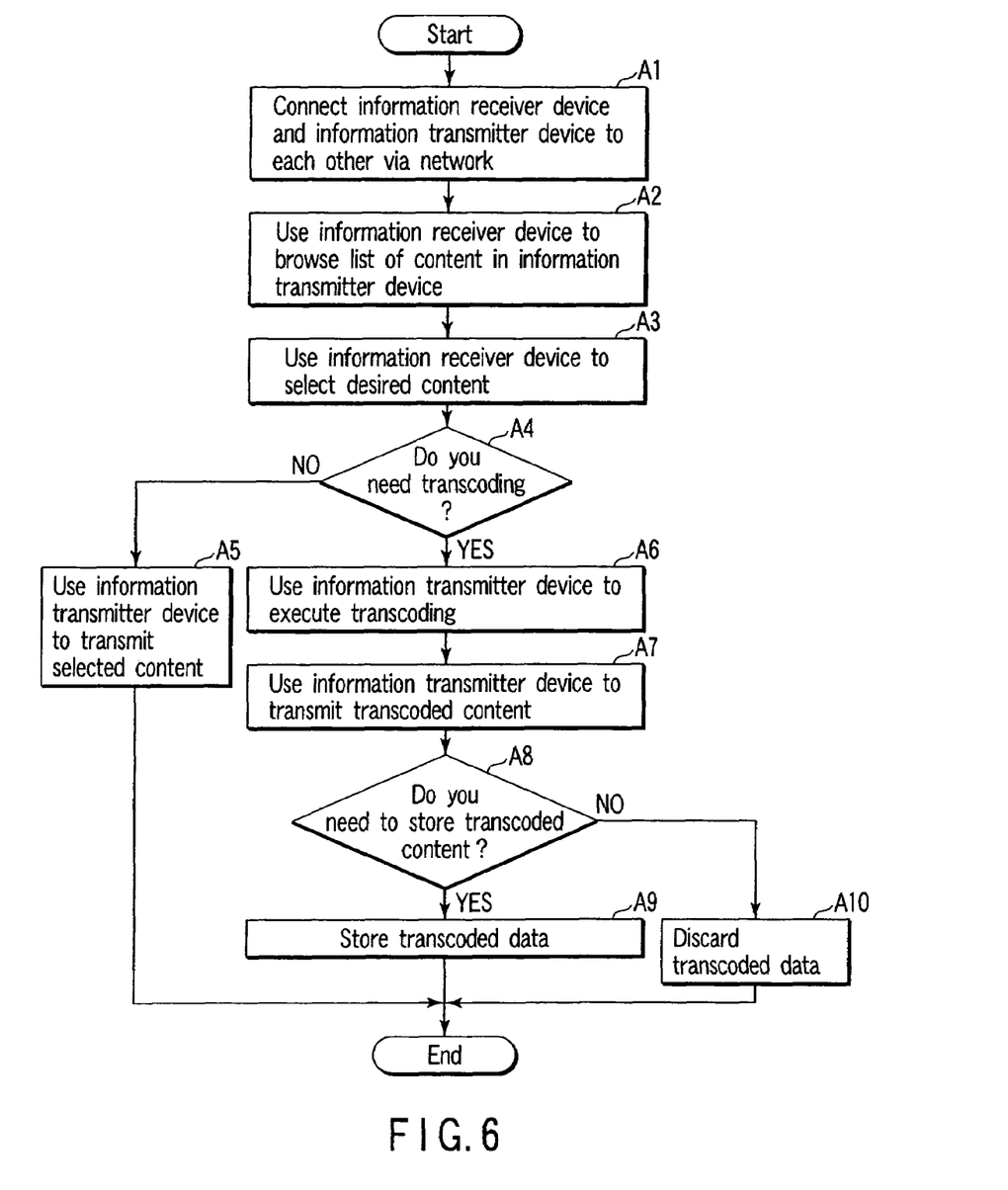
FIG. 6 is a flowchart showing operating procedures for transferring content in the in-house network system according to the first embodiment.

FIG. 6 is a flowchart showing a procedure for transferring content in a in-house network system according to the present embodiment.

Where the content-stored in the stationary electronic apparatus 1 is viewed by using the electronic apparatus 2 for portable use, first, the electronic apparatus 2 serving as an information receiver device (client) and the electronic apparatus 1 serving as an information transmitter device (server) are connected to each other via a network (step A1). When this network connection is completed, the electronic apparatus 2 which is the information receiver device refers to a list of content stored in the electronic apparatus 1 (step A2). Then, the electronic apparatus 2 which is the information receiver device selects desired content from the list of content referred to (step A3).

Upon the receipt of this selection, the electronic apparatus 1 which is the information transmitter device judges whether or not transcoding is required upon transmission of the content (step S4). If this transcoding is not required (NO in step A4), the electronic apparatus 1 which is the information transmitter device executes transmission of the selected content (step A5). In addition, when the transcoding is required (YES in step A4), the electronic apparatus 1 which is the information transmitter device executes transcoding (step A6), and transmits the content after being transcoded to the electronic apparatus 2 which is the information receiver device (step A7).

When this transcoding has been carried out, the electronic apparatus 1 which is the information transmitter device judges whether or not there is a need for storing the content after being transcoded (step A8). Then, in the case where the judgment result is affirmative (YES in step A8), the electronic apparatus 1 which is the information transmitter device stores the content after transcoded (step A9). On the other hand, in the case where the being judgment result is negative (NO in step A8), the content after being transcoded is discarded (step A10).

As described above, according to the in-house network system of the present embodiment, the content after being transcoded is managed according to the user's request.

Second Embodiment

Figure 7:
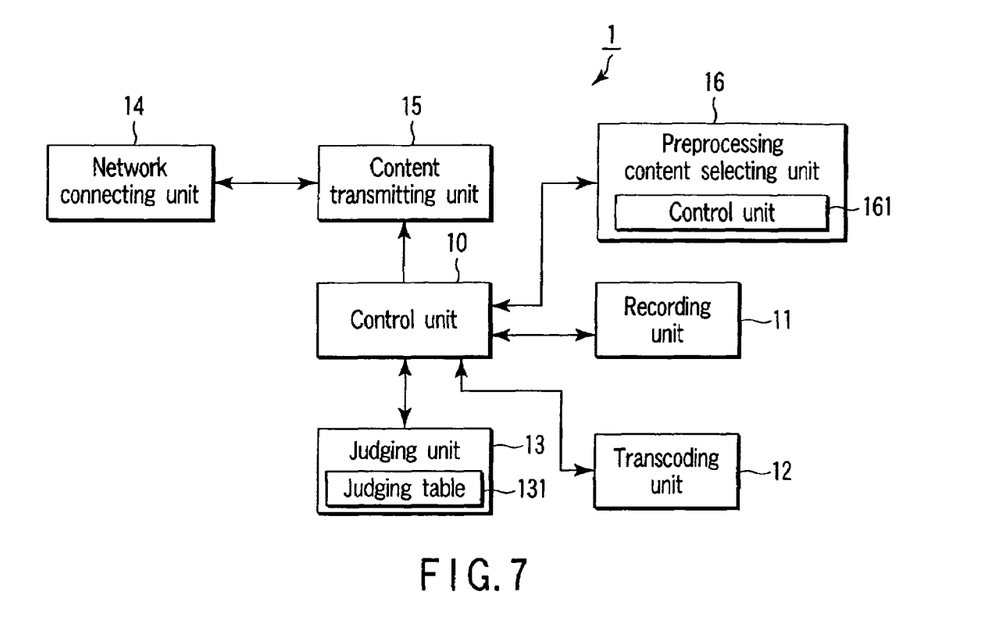
FIG. 7 is s view showing a system configuration of an electronic apparatus (information transmitter device) according to a second embodiment.

A second embodiment of the present invention will be described. FIG. 7 is a view showing a system configuration of an electronic apparatus 1 in the second embodiment. In the figure, the same constituent elements of the electronic apparatus 1 in the first embodiment described previously with respect to FIG. 2 are designated by the same reference numerals.

In this electronic apparatus 1 according to the second embodiment, a preprocessing content selecting unit 16 is further provided as shown in FIG. 7. When content is transferred to an electronic apparatus 2, the electronic apparatus 1 according to the first embodiment described previously executes transcoding, and judges whether or not to store the content after being transcoded. However, when given content is stored in the recording unit 11, the electronic apparatus 1 according to the second embodiment judges whether or not to execute transcoding when the content is stored, and stores in advance both the original content and the content after being transcoded (before a request from the electronic apparatus 2). In order to perform this judgment, the preprocessing content selecting unit 16 comprises a preprocessing table 161.

Figure 8:
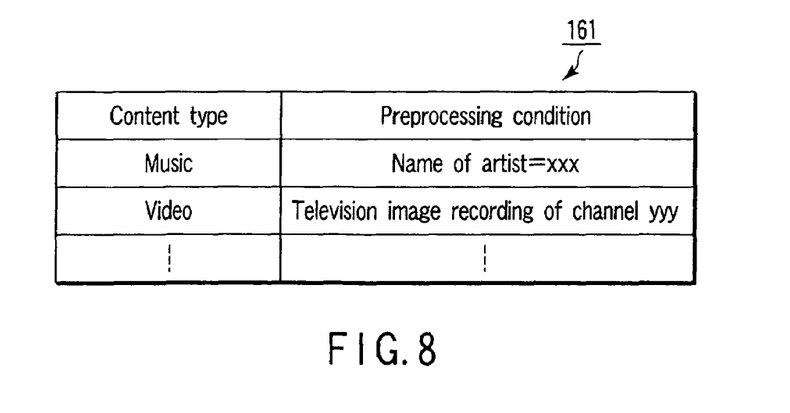
FIG. 8 is a view showing a specific example of a preprocessing table provided in a preprocessing content selecting unit of the electronic apparatus (information transmitter device) according to the second embodiment.
Figure 9:
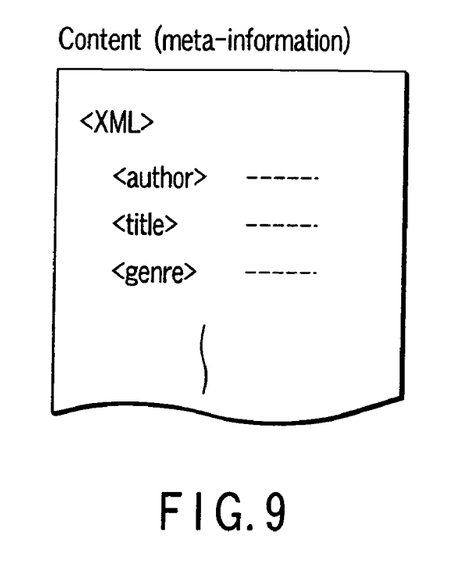
FIG. 9 is a view showing an example of meta information in accordance with an XML format provided as an accessory to each of the content.

FIG. 8 shows a specific example of the preprocessing table 161 provided in the preprocessing content selecting unit 16. As shown in the figure, the preprocessing table 161 consists of two fields, i.e., a "content type" and a "preprocessing condition". Meta-information in extensible markup language (XML) format is provided as accessories to each piece of content, as shown in FIG. 9. Thus, an arbitrary tag and its value are defined as a selection condition, whereby content matching a user's preference can be selected from among a number of piece of content.

Namely, in this electronic apparatus 1 according to the second embodiment, when given content is stored in the recording unit 11, the preprocessing content selecting unit 16 judges whether the content matches the user's preference. When the judgment result is affirmative, the judgment unit 13 judges whether or not transcoding is required. For example, when the judging table 131 is as shown in FIG. 4 and the compression format of the content targeted for processing is MPEG-2, a search is made for an entry indicating that the "input format" in the judging table 131 is "MPEG-2" and the "judgment result" is "record". When such an entry is detected, it is determined that a transcode for the compression format of that "output format" is executed.

As described above, according to the in-house network system of the present embodiment, more proper management is achieved by making a selection matching the user's preference, and then, transcoding and storing it in advance.

Third Embodiment

Figure 10:
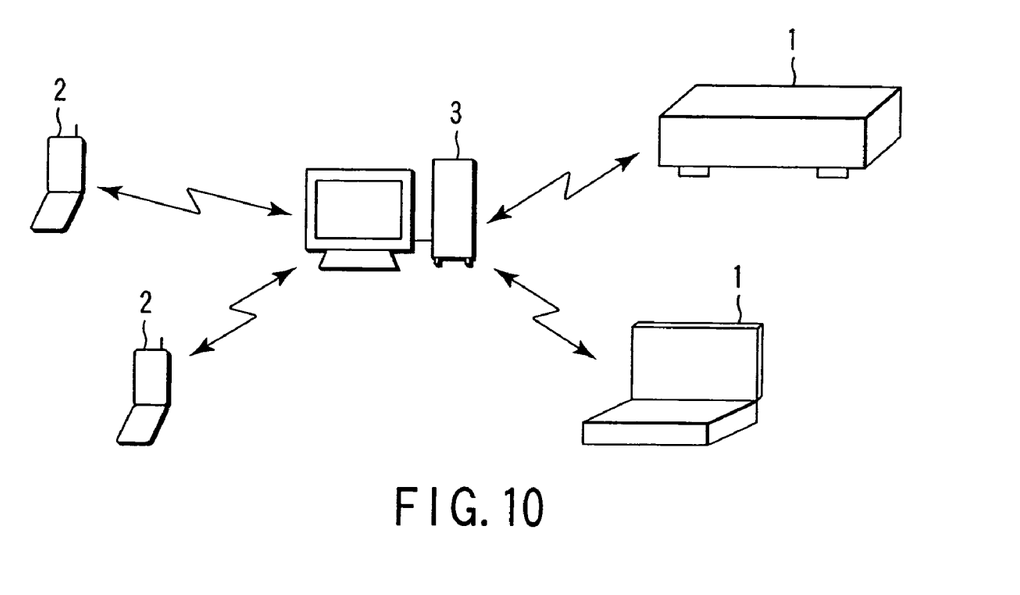
FIG. 10 is a view showing a network configuration of a in-house network system according to a third embodiment.

Now, a third embodiment of the present invention will be described here. FIG. 10 is a view showing a network configuration of an in-house network system according to the present embodiment.

In the in-house network system according to the first and second embodiments described previously, the stationary electronic apparatus 1 has a transcoding function. Thus, the exchange of content between the electronic apparatus 1 and an electronic apparatus 2 for portable use is directly carried out between the parties concerned. In contrast, in the in-house network system according to the third embodiment, an electronic apparatus 3 having a transcoding function is interposed to carry out the exchange of the content between the electronic apparatus 1 and the electronic apparatus 2.

For example, when the content stored in the electronic apparatus 1 is viewed by using the electronic apparatus 2, if transcoding of the content is required, the electronic apparatus 3 which relays transfer of the content integrally executes this transcoding.

If this electronic apparatus 3 comprises a function identical to the electronic apparatus 1 according to the first embodiment, the content after being transcoded is stored as required. In addition, if the electronic apparatus 3 comprises a function identical to the electronic apparatus 1 according to the second embodiment, when new content is stored in any electronic apparatus 1, it becomes possible to acquire the content in advance as required, and then, transcode and store it. Further, in this in-house network system according to the third embodiment, the electronic apparatus 3 which relays transmission of content is connected to a plurality of electronic apparatuses 1 via a network. Thus, all of the recording units 11 provided in these plurality of electronic apparatuses 1 are utilized as a storage place of the content after being transcoded.

Figure 11:
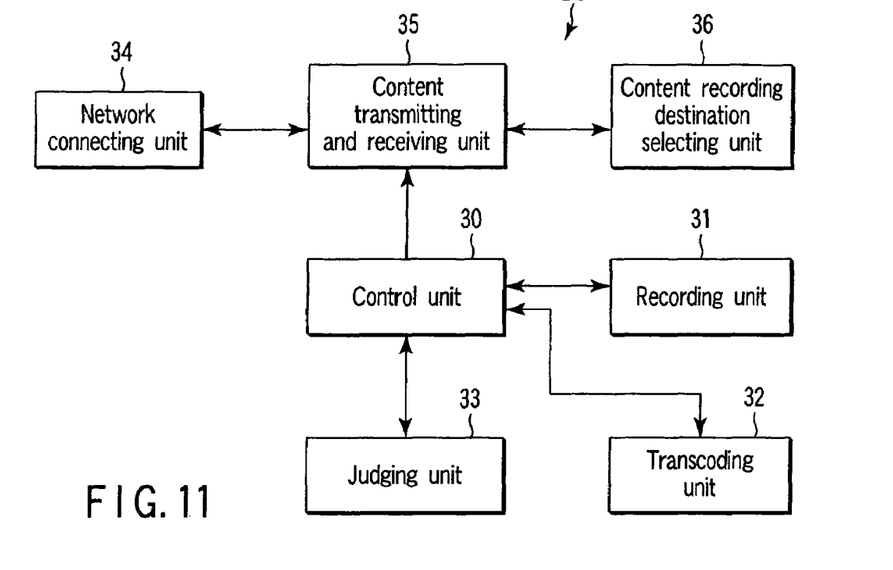
FIG. 11 is a view showing a system configuration of an electronic apparatus (information relay device) according to the third embodiment.

FIG. 11 is a view showing a system configuration of the electronic apparatus 3. As shown in FIG. 11, the electronic apparatus 3 has: a control unit 30; a recording unit 31; a transcoding unit 32; a judging unit 33; a network connecting unit 34; a content transmitting and receiving unit 35; and a content recording destination selecting unit 36. Among them, the control unit 30 to the network connecting unit 34 correspond to the control unit 10 to the network connecting unit 14 of the electronic apparatus 1 in the first embodiment described previously, shown in FIG. 2. In addition, the content transmitting and receiving unit 35 has a content receiving function added to the content transmitting unit 15. In addition, the content recording destination selecting unit 35 is a constituent element specific to the electronic apparatus 3 according to the third embodiment, and makes a selection of a destination for storing the content after being transcoded.

Figure 12:
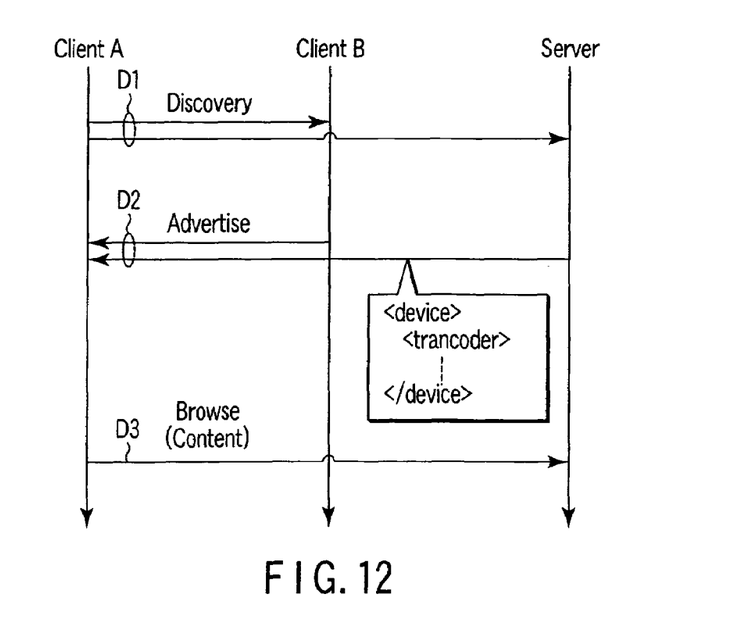
FIG. 12 is a view explaining a general flow of operation relevant to how an electronic apparatus (information relay device) based network connection is made.

In this third embodiment, the electronic apparatus 3 is defined as a server; and the electronic apparatus 1 and the electronic apparatus 2 are defined as clients. A general flow of operation will be described with reference to FIG. 12 with respect to how an electronic apparatus 3 based network connection is made.

Consider a case in which any electronic apparatus 2 (client A) is started up, and an attempt is made to make a network connection in order to utilize the content stored by a peripheral device. At this time, client A first outputs a message for making a search for peripheral devices (D1 of FIG. 12). Each device having received this message returns to the client a message notifying the presence of such a peripheral device (D2 of FIG. 12).

Among these response messages, a specific tag (<transcoder>) is included in a response message returned by the given electronic apparatus 3 which is a server. If this tag is found, the client A interprets that a device having returned this response message is a server, and all the content can be acquired from the server. Subsequently, even if the client A receives a response message from client B, the client A makes a query to this server as to what kinds of content can be provided (D3 of FIG. 12).

Having received the query from the electronic apparatus 2 through such procedures, the electronic apparatus 3 returns to the client a list of compression format content which can be transcoded by a transcoding function incorporated in the server in addition to the compression format content actually stored by each of the electronic apparatuses 1. Where transfer of the content is relayed while transcoding is carried out, the electronic apparatus 3 executes the exchange as shown in FIG. 13 with the electronic apparatus 2.

Figure 13:
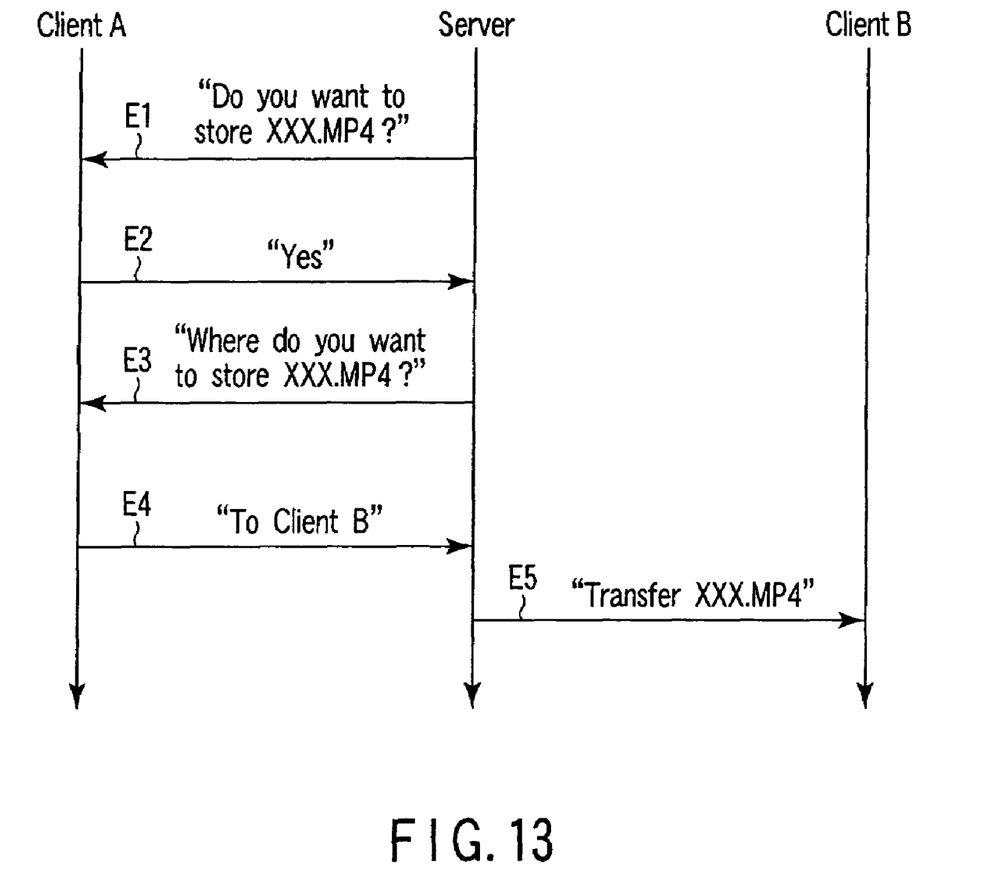
FIG. 13 is a view explaining an exchange which is carried out by a control unit of the electronic apparatus (information relay device) according to the third embodiment.

First, the control unit 30 of the electronic apparatus 3 makes a query as to whether or not to store the content after being transcoded (E1 of FIG. 13). If the response is affirmative (E2 of FIG. 13), the content recording destination selecting unit 36 then makes a query as to where to store the content after being transcoded (E3 of FIG. 13). When any electronic apparatus 1 has been specified as a destination of storing the content (E4 of FIG. 13), the content after being transcoded is transferred to the specified electronic apparatus 1, and then, the transferred content is stored in the recording unit 11 (E5 of FIG. 13).

Figure 14:
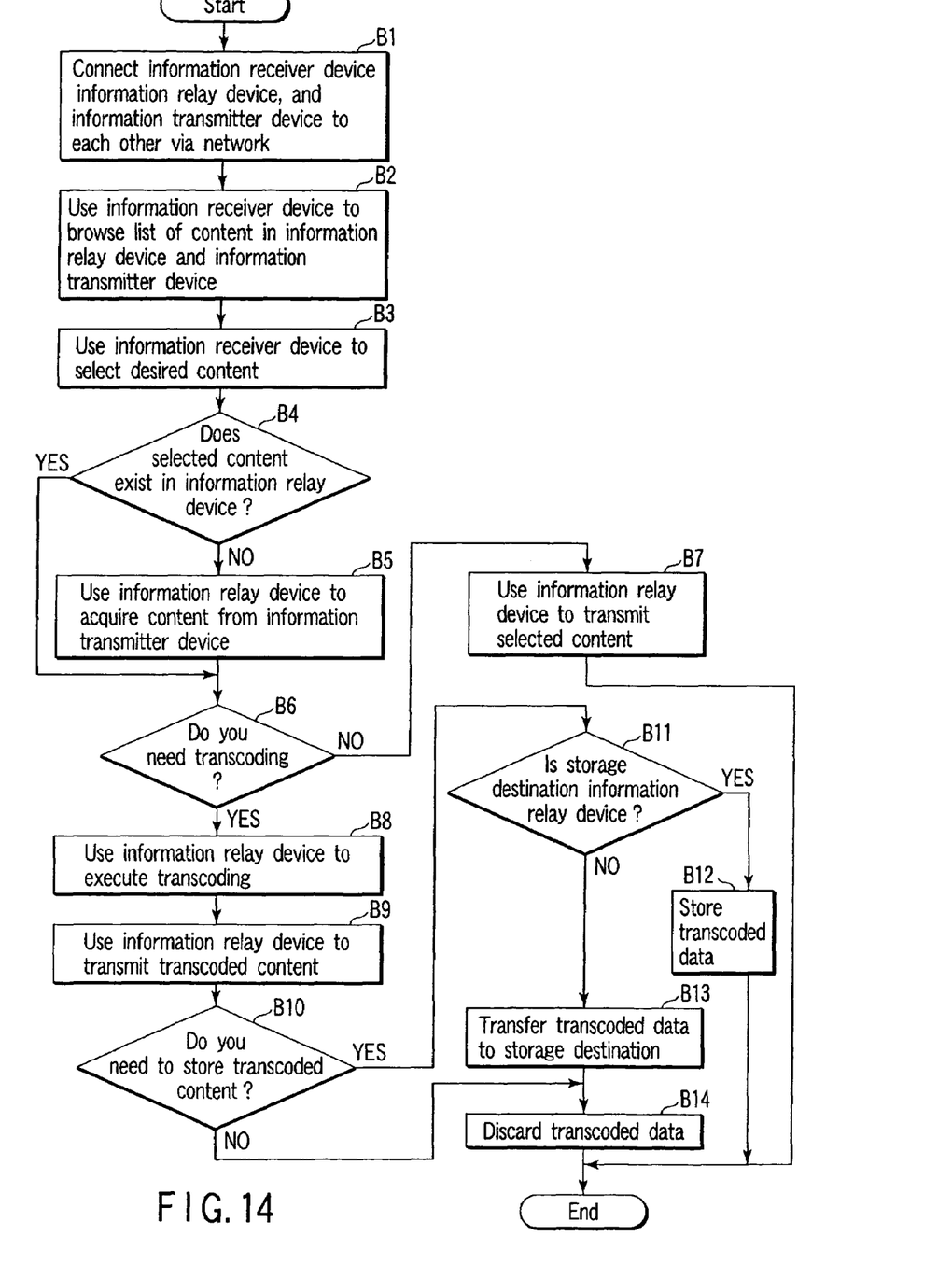
FIG. 14 is a flowchart showing operating procedures for transferring content in the in-house network system according to the third embodiment.

FIG. 14 is a flowchart showing a procedure for transferring content in the in-house network system according to the present embodiment.

In the case where the content stored in a stationary electronic apparatus 1 is viewed by using an electronic apparatus 2 for portable use, first, the electronic apparatuses 1 and 2 serving as an information transmitter device and an information receiver device (client) and the electronic apparatus 3 serving as an information relay device (server) are connected to each other via a network (step B1). When this network connection is completed, the electronic apparatus 2 which is the information receiver device refers to a list of content stored in the electronic apparatus 1 and the electronic apparatus 3 (step B2). Then, the electronic apparatus 2 which is the information receiver device selects desired content from the list of content referred to (step B3).

Upon the receipt of this selection, first, the electronic apparatus 3 which is the information relay device checks to see if the content exists on that device (step B4). If the check result is negative (NO in step B4), the content is acquired from the electronic apparatus 1 which stores the content (step B5).

Next, the electronic apparatus 3 which is the information relay device judges whether or not transcoding is required upon transmission of the content (step B6). If transcoding is not required, (NO in step B6), the electronic apparatus 3 executes transmission of the selected content (step B7). If transcoding is required (YES in step B6), the electronic apparatus 3 which is the information relay device executes the transcoding (step B8), and transmits the content after being transcoded to the electronic apparatus 2 which is the information receiver device (step B9).

When this transcoding has been carried out, the electronic apparatus 3 which is the information relay device judges whether or not there is a need for storing the content after being transcoded (step B10). Then, in the case where the judgment result is affirmative (YES in step B10), the electronic apparatus 3 which is the information relay device determines a destination for storing the content after being transcoded (step B11). When the storage destination is the information relay device (YES in step B11), the content after being transcoded is stored in the information relay device (step B12). If the storage destination is not the information relay device (NO in step B11), the content after being transcoded is transferred to the storage destination (step B13), and the content after being transcoded, remaining on the information relay device, is discarded (step B14). In addition, in the case where it is judged that there is no need for storing content after being transcoded (NO in step B10), the content after being transcoded is discarded (step B14).

As described above, according to the in-house network system of the present embodiment, it becomes possible to utilize all of the electronic apparatuses connected via a network as destinations of storing the content after being transcoded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a network connecting unit configured to make network connection with a client;
   a storage unit which stores compressed and encoded content;
   a transcoding unit configured to convert the content stored in the storage unit to content compressed and encoded in a different format for the client connected via the network connecting unit;
   a content transmitting unit configured to transmit the content stored in the storage unit or the content converted by the transcoding unit to the client connected via the network connecting unit;
   a setting unit configured to set a table in which information indicating whether or not to store the content after being converted has been recorded for combinations of: a) compression and encoding formats before converting, and b) compression and encoding formats after converting;
   a judging unit configured to judge whether or not to store the content converted by the transcoding unit based on the table set by the setting unit; and
   a control unit configured to store the content converted by the transcoding unit in the storage unit, when the judging unit judges that the content converted by the transcoding unit is to be stored in the storage unit.

2. The electronic apparatus according to claim 1, wherein the control unit causes the judging unit to execute the judgment when it has converted the content by the transcoding unit in order to transmit the content by the content transmitting unit.

3. The electronic apparatus according to claim 1 wherein the control unit causes the judging unit to execute the judgment when new content has been stored in the storage unit, and causes the transcoding unit to execute conversion of the content at that time point.

4. An electronic apparatus comprising:
   a network connecting unit configured to make network connection:
   a storage unit:
   a relay unit configured to relay transmission and receiving of content compressed and encoded between a transmitting apparatus and a receiving apparatus connected via the network connecting unit:
   a transcoding unit configured to convert the content to be relayed to content compressed and encoded in a different format for the receiving apparatus in which transmission and receiving of the content are relayed by the relay unit;
   a setting unit configured to set a table in which information indicating whether or not to store the content after being converted has been recorded for combinations of: a) compression and encoding formats before converting, and b) compression and encoding formats after converting;
   a judging unit configured to judge whether or not to store the content converted by the transcoding unit based on the table set by the setting unit; and
   a control unit configured to store the content converted by the transcoding unit in the storage unit, when the judging unit judges that the content converted by the transcoding unit is to be stored in the storage unit.

5. The electronic apparatus according to claim 4, wherein the control unit judges whether or not the predetermined condition has been met when it has converted the content by the transcoding unit in order to relay the content by the relay unit.

6. The electronic apparatus according to claim 4, wherein the control unit causes the judging unit to execute the judgment when it is detected that another apparatus connected via the network connecting unit stores new content, and acquires the content from the other apparatus at that time point and causes the transcoding unit to execute conversion of the acquired content.

7. A content management method of an electronic apparatus which has a network connecting unit configured to make network connection; a storage unit which stores data; and a relay unit configured to relay transmission and receiving of content compressed and encoded between a transmitting apparatus and a receiving apparatus connected via the network comprising:

converting the content to be relayed to content compressed and encoded in a different format for the receiving apparatus in which transmission and receiving of the content is relayed by the relay unit;

setting a table in which information indicating whether or not to store the content after being converted has been recorded for combinations of: a) compression and encoding formats before the converting, and b) compression and encoding formats after the converting;

judging whether or not to store the converted content based on the set table; and storing the converted content in the storage unit, when it is judged that the converted content is to be stored in the storage unit.

8. A content management method of an electronic apparatus which has a network connecting unit configured to make network connection; a storage unit which stores data; and a relay unit configured to relay transmission and receiving of content compressed and encoded between a transmitting apparatus and a receiving apparatus connected via the network connecting unit comprising:

converting the content to be relayed to content compressed and encoded in a different format for the receiving apparatus in which transmission and receiving of the content is relayed by the relay unit;

setting a table in which information indicating whether or not to store the content after being converted has been recorded for combinations of compression and encoding formats before the converting and compression and encoding formats after the converting;

judging whether or not to store the converted content based on the set table; and storing the converted content in the storage unit, when it is judged that the converted content is to be stored in the storage unit.

9. The content management method according to claim 7 wherein the judging includes executing the judgment when it has been required to convert the content in order to relay the content by the relay unit.

10. The content management method according to claim 8, wherein;

the judging includes executing the judgment when it is detected that the transmitting apparatus connected via the network connecting unit stores new content; and the storing includes acquiring the content from the transmitting apparatus when it is judged that the new content is to be stored in the storage unit at that time point.

* * * * *